(12) United States Patent
Huston, III et al.

(10) Patent No.: US 8,990,938 B2
(45) Date of Patent: Mar. 24, 2015

(54) ANALYZING RESPONSE TRAFFIC TO DETECT A MALICIOUS SOURCE

(71) Applicant: Arbor Networks, Inc., Plano, TX (US)

(72) Inventors: Lawrence Bruce Huston, III, Ann Arbor, MI (US); Aaron Campbell, Hammonds Plains (CA)

(73) Assignee: Arbor Networks, Inc., Burlington, MA (US)

( * ) Notice: Subject to any disclaimer, the term of this patent is extended or adjusted under 35 U.S.C. 154(b) by 19 days.

(21) Appl. No.: 13/896,009

(22) Filed: May 16, 2013

(65) Prior Publication Data
US 2013/0263259 A1 Oct. 3, 2013

Related U.S. Application Data

(63) Continuation-in-part of application No. 13/328,206, filed on Dec. 16, 2011.

(60) Provisional application No. 61/528,717, filed on Aug. 29, 2011.

(51) Int. Cl.
*H04L 29/06* (2006.01)

(52) U.S. Cl.
CPC ........ *H04L 63/1425* (2013.01); *H04L 63/1408* (2013.01); *H04L 63/1458* (2013.01)
USPC ................................................ 726/22; 726/13

(58) Field of Classification Search
CPC ............ H04L 63/1441; H04L 67/1095; G06F 11/2056
USPC ...................................................... 726/13, 22
See application file for complete search history.

(56) References Cited

U.S. PATENT DOCUMENTS

| | | | |
|---|---|---|---|
| 2006/0059163 A1* | 3/2006 | Frattura et al. | 707/10 |
| 2007/0050686 A1* | 3/2007 | Keeton et al. | 714/48 |
| 2009/0293122 A1* | 11/2009 | Abdel-Aziz et al. | 726/23 |

* cited by examiner

*Primary Examiner* — Hadi Armouche
*Assistant Examiner* — Dao Ho
(74) *Attorney, Agent, or Firm* — Locke Lord LLP; Scott D. Wofsy; Christopher J. Capelli

(57) ABSTRACT

A system and method are provided to receive mirrored versions of transmissions sent by a node in response to initiating transmissions received by the node over a network. At least one mirrored response transmission sent from the node in response to at least one corresponding initiating transmission is analyzed to determine whether or not the corresponding at least one initiating transmission is malicious.

5 Claims, 3 Drawing Sheets

ANALYZING RESPONSE TRAFFIC TO DETECT A MALICIOUS SOURCE

CROSS-REFERENCE TO RELATED APPLICATION

This application is a continuation-in-part of co-pending U.S. patent application Ser. No. 13/328,206, which claims priority to U.S. Provisional Application No. 61/528,717. The contents of each of U.S. patent application Ser. Nos. 13/328,206 and 61/528,717 are hereby incorporated by reference in their entirety.

FIELD OF THE INVENTION

The present invention relates to communication networks, and more specifically, to network management techniques for detecting traffic from a malicious source.

BACKGROUND OF THE INVENTION

With advances in integrated circuit, microprocessor, networking and communication technologies, increasing numbers of devices, in particular, digital computing devices, are being networked together. Devices are often first coupled to a local area network, such as an Ethernet based office/home network. In turn, local area networks are interconnected together through wide area networks, such as ATM networks, Frame Relays, and the like. Of particular interest is the TCP/IP based global inter-networks—the Internet.

To ensure successful communication over the Internet, it is important to prevent undesirable network traffic. For example, the use of denial of service (DoS) attacks has grown over the years to prevent legitimate traffic from reaching its intended destination. Accordingly, the utilization of effective preventative measures has become increasingly important.

One preventive measure is the use of a monitoring device to inspect network traffic before it reaches an intended destination. If it appears that the content has originated from a malicious source, then the traffic can be prevented from reaching the intended destination.

Nevertheless, some attacks may be difficult to detect by inspecting source traffic. For instance, one commonly used approach to attacking DNS servers involves sending a large number of malformed domain name queries to a given DNS server. It may not always be possible to detect that the traffic is coming from a malicious source. This is especially true if the source is a legitimate source that has been hijacked by a malicious actor. Therefore, what is needed is a way to detect traffic originating from a malicious source through the inspection of traffic other than source traffic.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

To achieve these and other advantages, and in accordance with the purposes of the below illustrated embodiments, in one aspect, a system and method are provided to receive mirrored versions of transmissions sent by a node in response to initiating transmissions received by the node over a network. At least one mirrored response transmission sent from the node in response to at least one corresponding initiating transmission is analyzed to determine whether or not the corresponding at least one initiating transmission is malicious.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
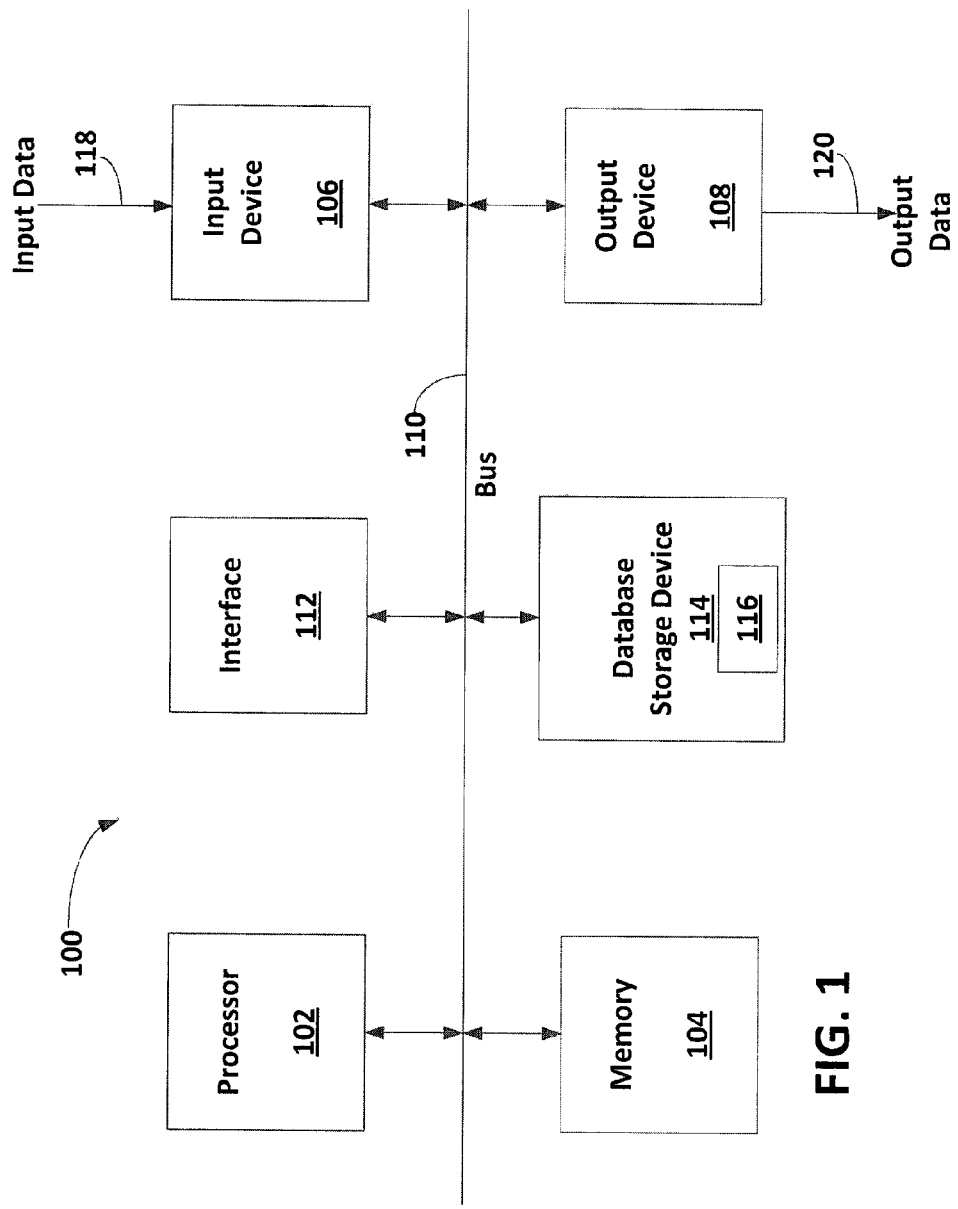
FIG. 1 illustrates a system overview of a computer system utilized in the certain illustrated embodiments.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system in which illustrated embodiments of the present invention may be implemented. A generalized computering embodiment in which the present invention can be realized is depicted in FIG. 1 illustrating a processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
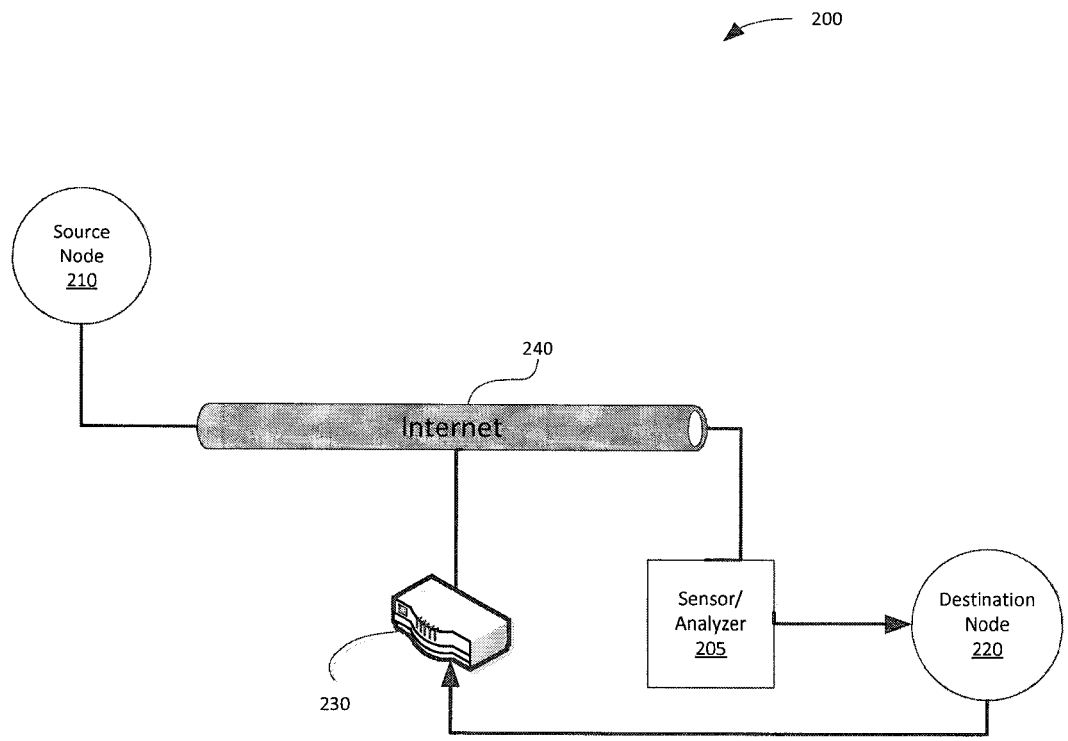
FIG. 2 illustrates a network view of a certain illustrated embodiment.

With the exemplary computing system environment 100 of FIG. 1 being generally shown and discussed above, depicted in FIG. 2 is a generalized diagram of a system (referenced generally by numeral 200) for performing the below illustrated techniques of the present invention, which may be utilized with system 100, or components thereof. It is to be understood the present invention is not be limited to what is shown in FIG. 2, as it is to be utilized in any system, apparatus and/or device coupled to a network for receiving samples of web traffic to and to analyze the web traffic to determine if it emanates from malicious source.

For instance, an illustrated use of the illustrated system and process described herein is with the PRAVAIL™ Availability Protection System (PRAVAIL™ APS) from Arbor® Networks. PRAVAIL™ APS is a network security product configured and adapted for generally preventing DDoS attacks and availability threats that affect data centers and enterprise networks. PRAVAIL™ APS may be deployed by network/data center operators in front of services to stop application-layer attacks. PRAVAIL™ APS may further be integrated upstream in a network/data center to preferably thwart volumetric DDoS attacks. Features of PRAVAIL™ APS include (but are not limited to): detecting and blocking emerging application-layer DDoS attacks; and deploy a turnkey solution to thwart DDoS threats; accelerate responses to DDoS attacks to prevent disruption of legitimate services.

System 200 generally includes a sensor/analyzing apparatus 205 coupled to one or more source nodes 210, destination nodes 220 and routing devices 230 either directly or through a network, such as the Internet 240. It is to be understood and appreciated the detector/analyzing apparatus 205, source nodes 210, destination nodes 220, and routing devices 230 may include the above described system 100, or components therefrom, to perform the below described functionality in accordance with an illustrated embodiment. It is to be further understood and appreciated sensor/analyzing apparatus 205, source nodes 210, destination nodes 220, and routing devices 230 may be separated into standalone components or integrated into various combinations.

Preferably, each sensor/analyzing apparatus 205 is a device for acquiring samples of IP traffic sent to one or more destination nodes 220 for analysis to determine whether or not the IP traffic originates from a malicious source node 210. In one embodiment, sensor/analyzing apparatus 210 may have a first port to receive traffic and a second port for sending the traffic to a destination node 220. In another example, sensor/analyzing apparatus 205 may have a single port for receiving traffic and sending the traffic to the destination node 220. In one embodiment, sensor/analyzing apparatus 205 includes a port for receiving mirrored traffic from a routing device 230.

A source node 210 may be a legitimate source trying to gain access to information and resources from destination node 220 for a legitimate purpose or it may be malicious. A malicious source is a source that is trying to gain access to information and resources from destination node 220 for malicious purposes, such as stealing information, implanting viruses, or hampering the performance of destination node 220. It should be noted that the terms source node 210 and destination node 220 are used for exemplary purposes only. A source node 210 may be a destination node 220 in certain circumstances, and vice versa.

A routing device 230 is a device that receives traffic over a network and reviews the address information in the data packets comprising the traffic to determine the ultimate destination of the traffic. The routing device 230 then either forwards the traffic to its final destination or another router. In one example, a routing device 230 may include a mirroring port. Routing device 230 on one example copies (or mirrors) traffic that is received by routing device 230 and utilizes the mirroring port to send the traffic to another device.

For instance, it should be noted that in one embodiment system 200 is configured such that sensor/analyzing device 205 is upstream of destination node 220. Thus, any traffic sent to destination node 220 will be received and analyzed by sensor/analyzing device 205 before being sent to destination node. However, it may be that for efficiency purposes, it might be worthwhile to allow response traffic from destination node 220 to take a different route back to source node 210. Accordingly, system 200 is configured such that response data sent from destination node 220 is not first sent to sensor/analyzing device 205, but rather travels through one or more routing devices 230 to reach source node 230.

Yet, it would be worthwhile to examine and/or analyze response traffic sent from destination node 220 in response to a corresponding request for information or resources from a source node 210. Therefore, in one example, one or more routing devices 230 are configured to mirror traffic that they receive and send the mirrored traffic to sensor/analyzing device 205. In this manner, sensor/analyzing device 205 can analyze response traffic sent from one or more destination nodes 220 to one or more source nodes 210 and initiate countermeasures if it is determined from the response traffic that the source node 210 is sending is malicious. Another exemplary configuration of such a system is described in co-pending U.S. patent applications with Ser. Nos. 13/328, 206 and 61/528,717, which have already been incorporated by reference, in their entirety, into this application.

Figure 3:
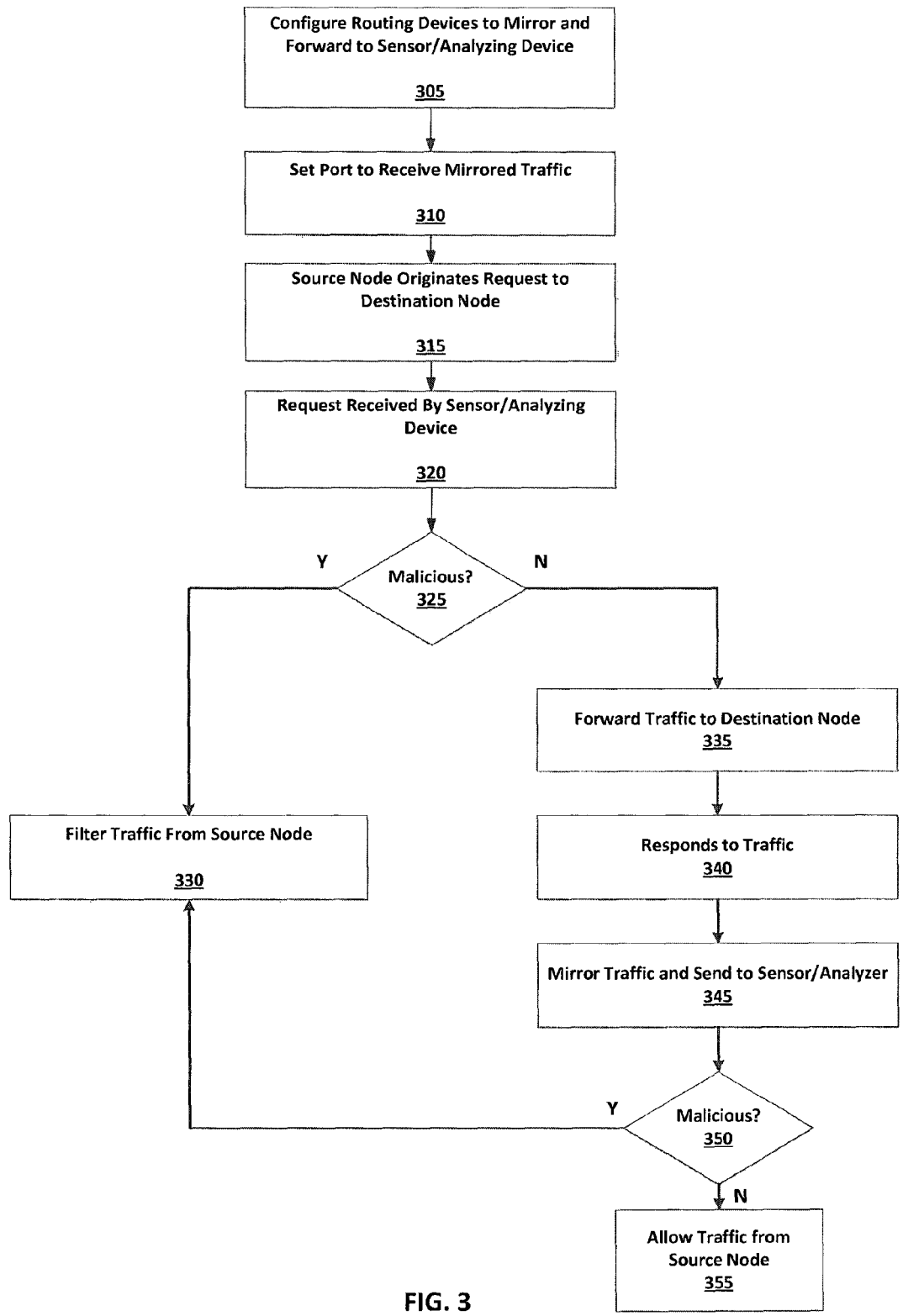
FIG. 3 depicts a method utilized with the illustrated embodiment of FIG. 2.

With reference now to FIG. 3, shown is a flow chart demonstrating implementation of the various exemplary embodiments of the present invention technique for detecting malicious sources through analysis of response traffic. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Starting at step 305, one or more routing devices 230 are configured to mirror traffic and to forward the mirrored traffic to sensor/analyzing device 205 through their respective mirroring ports. In step 310, a port of sensor analyzing/device 205 is set to receive mirrored traffic from the one or more routing devices. In step 315, a source node 210 originates a request for a resource or data from a destination node 220. In step 320, IP traffic representing the request is received by sensor/analyzing device 205. In step 325, sensor/analyzing apparatus 205 determines whether or not (or if there is a strong likelihood) the IP traffic is from a malicious source. If sensor/analyzing apparatus 205 determines that the request is, or is likely, from a malicious source, then in step 330, the sensor/analyzing apparatus filters or takes steps to prevent the IP traffic from source node 210 from reaching the destination node 220.

On the other hand, if sensor/analyzing apparatus 205 does not determine that the IP traffic is from, or is likely, from a malicious source then sensor/analyzing apparatus 205 will, in step 335, forward the traffic to the destination node 220.

In step 340, destination node 220 responds to IP traffic sent from source node 210. In one example, destination node 220 may respond with the information and/or resource requested by source node 210. In another example, destination node 220 may respond with a failure message that the requested information and/or resource is not available. In step 345, the response traffic is received by routing device 230, mirrored, and sent to sensor/analyzing apparatus 205 through its mirroring port. In step 350, sensor/analyzing apparatus 205 analyzes the response traffic to determine whether the source node 210 instigating destination node 220 to send the response traffic is malicious.

In one example, the sensor/analyzing apparatus 205 analyzes response traffic by comparing the number of times that destination node 220 sends failure messages to a particular source node 210. For instance, under normal conditions, the ratio of response messages that are successful to response messages that are a failure should be relatively high. On the other hand, a high rate of failure messages to a particular source node 210 may indicate that the destination node 220 is under attack. Therefore, the sensor/analyzing apparatus 205 may determine that the number of failure messages being sent to source node 210 is greater than a predetermined value and identify source node 210 as malicious. Accordingly, flow will proceed to step 330 in which sensor/analyzing apparatus 205 will filter future transmissions form source node 210 from reaching destination node 220. Otherwise, in step 355, sensor/analyzing apparatus 205 will continue to allow traffic from source node 210 to reach destination node 220.

With the certain illustrated embodiments described above, it is to be understood optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the illustrated embodiments and of the manner and process of making and using them in such full, clear, concise, and exact terms as to enable any person skilled in the art to which it pertains to make and use these devices and methods. The illustrated embodiments are, however, susceptible to modifications and alternative method steps from those discussed above that are fully equivalent. Consequently, the above described illustrated embodiments are not limited to the particular embodiments disclosed. On the contrary, they may encompass all modifications and alternative constructions and methods coming within the spirit and scope of the invention.

What is claimed is:

1. A method performed by a computing device connected to a network and having one or more processors and memory storing one or more programs for execution by the one or more processors, comprising:
    configuring the computer device to receive mirrored versions of transmissions sent by a destination node in response to initiating transmissions sent by a source node and received by the destination node over the network;
    receiving at least one mirrored response transmission sent from the destination node in response to at least one corresponding initiating transmission sent by the source node including receiving a plurality of mirrored response transmissions sent from the destination node wherein the plurality of mirrored response transmissions sent from the destination node comprise one of a requested resource from the destination node and at least one failure message indicating that the at least one resource is not available from the destination node;
    analyzing the at least one mirrored response transmission sent by the destination node to determine whether or not the corresponding at least one initiating transmission sent by the source node is malicious including computing a rate of failure messages sent to that at least one source node in the plurality of mirrored response transmissions sent from the destination node and determining that the at least one source node is sending malicious traffic if the rate of failure messages exceeds a predetermined threshold wherein computing a rate of failure messages includes calculating a ratio comprising a number of failure messages to a total of corresponding initiating transmissions; and
    receiving a plurality of corresponding initiating transmissions from at least one source node prior to receiving the at least one mirrored response transmission wherein the plurality of corresponding initiating transmissions from the at least one source node are requests for at least one resource from the destination node;
    sending the plurality of corresponding initiating transmissions to the destination node;
    determining that the corresponding initiating transmission is malicious in response to the ratio meeting a predetermined threshold;
    identifying a source node of the corresponding initiating transmission; and
    preventing future transmissions from the source node reaching the destination node.

2. The method of claim 1, further comprising:
    configuring the computing device to protect the destination node by directly receiving and monitoring traffic sent to the source node.

3. The method of claim 2, wherein the destination node is a domain name system (DNS) server.

4. The method of claim 1, wherein the step of receiving at least one mirrored response transmission comprises:
    receiving a mirrored transmission from a port of a network routing device that duplicates traffic that is sent to it.

5. The method of claim 4, wherein the port is a mirroring port of a network router.

* * * * *